Sept 10, 1957     D. T. AYERS, JR     2,805,550
BOOSTER BRAKE MECHANISM
Filed June 28, 1954     4 Sheets-Sheet 1
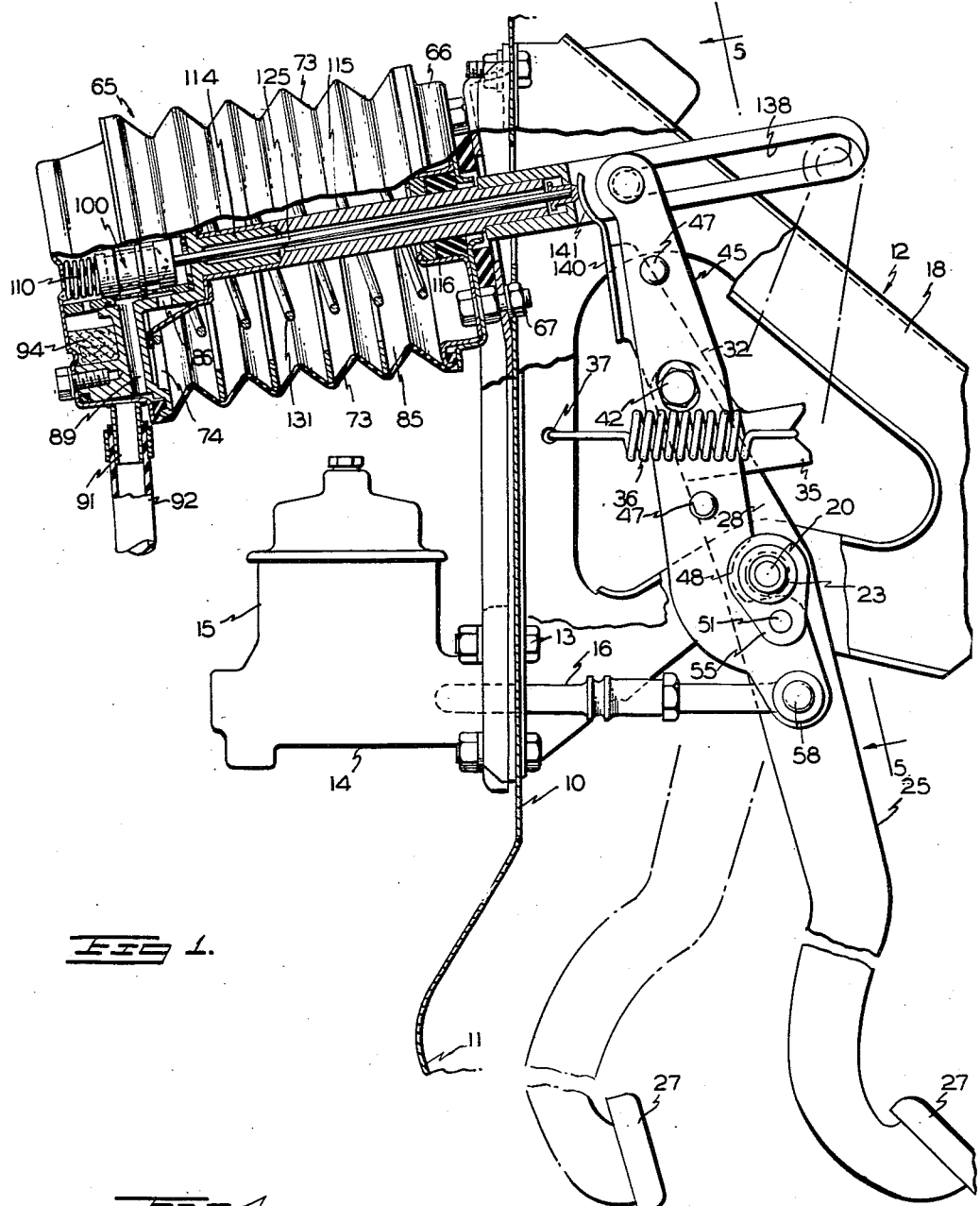
INVENTOR.
DAVID T. AYERS JR.
BY John F. Phillips
ATTORNEY

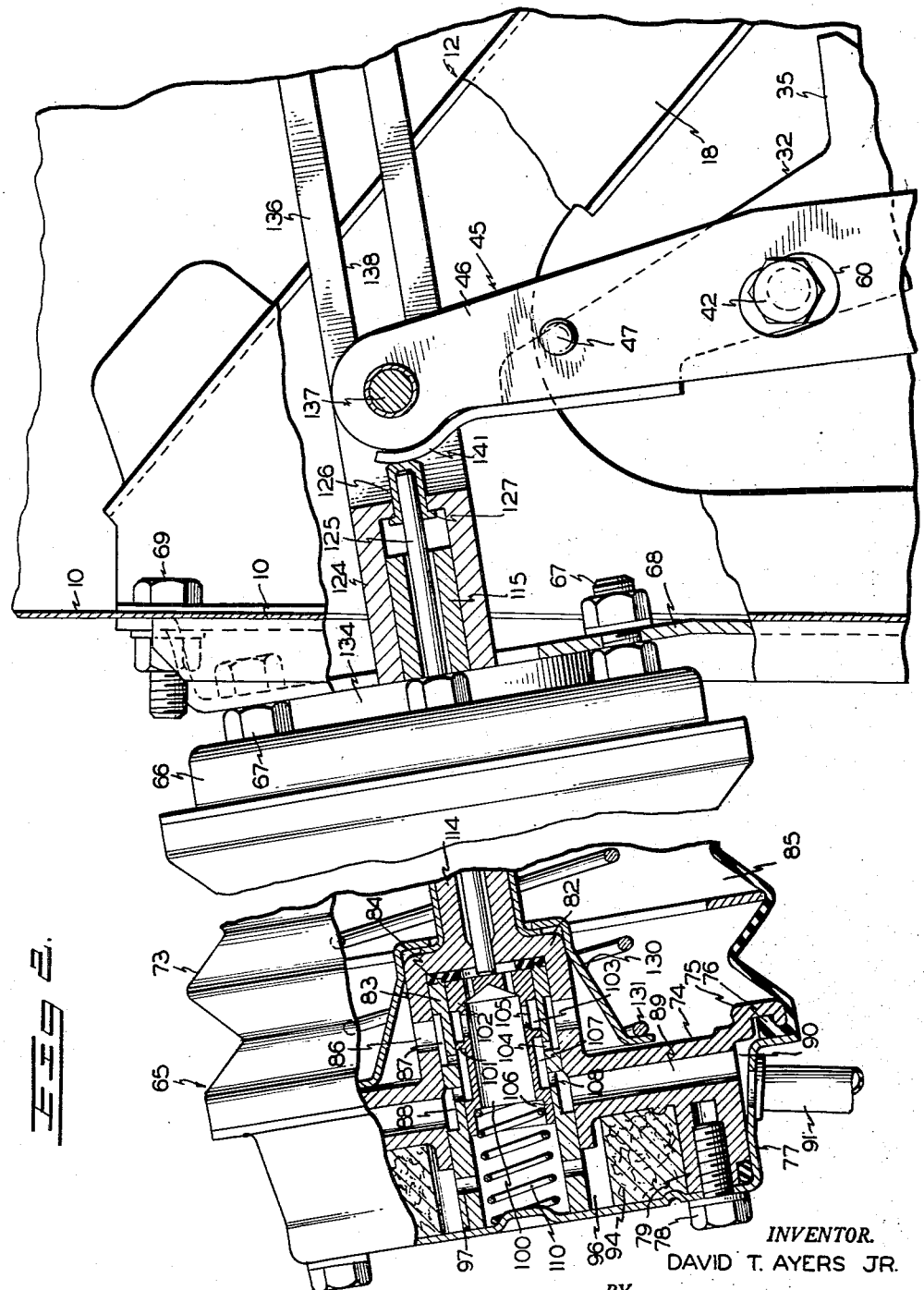

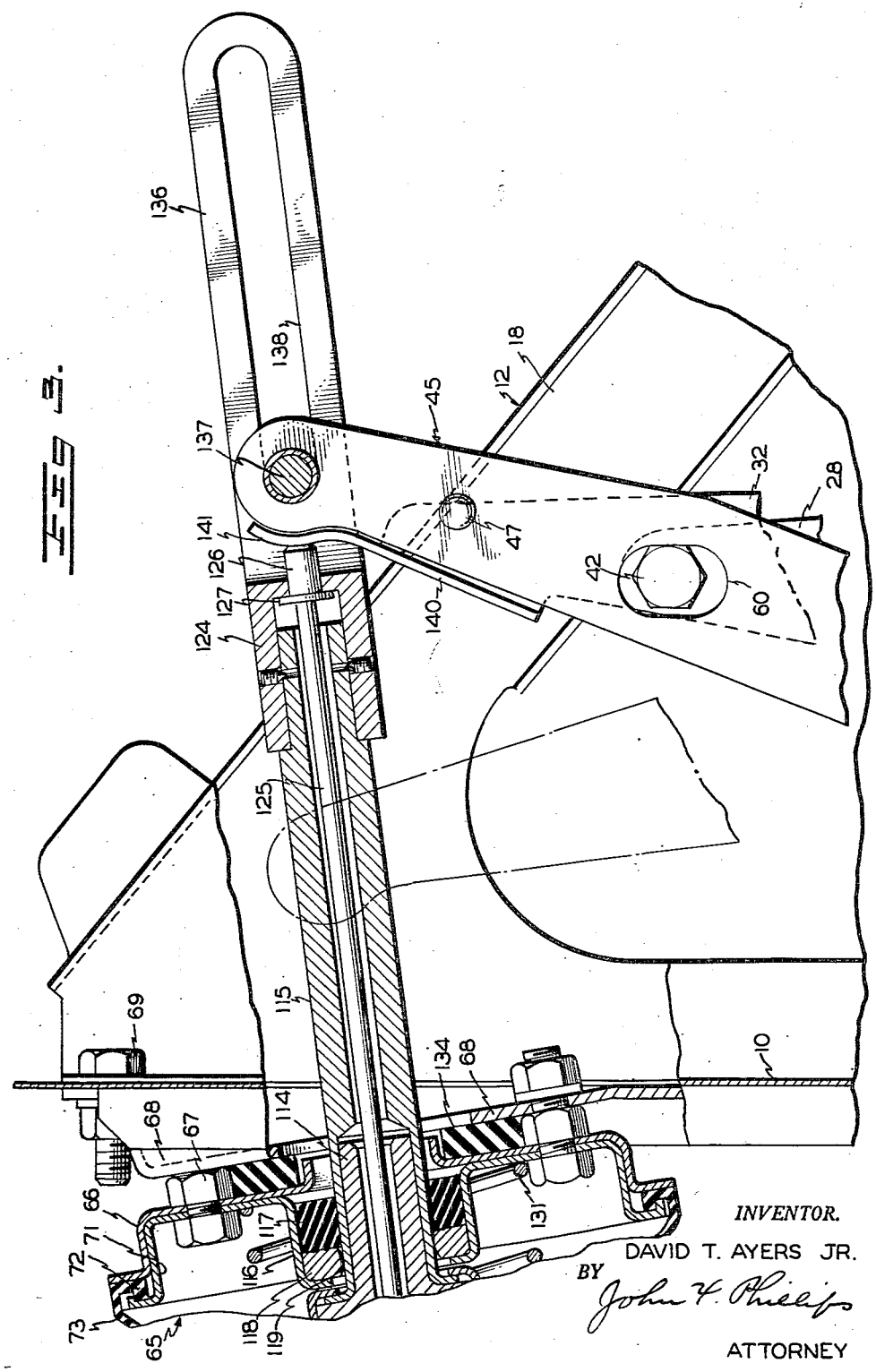

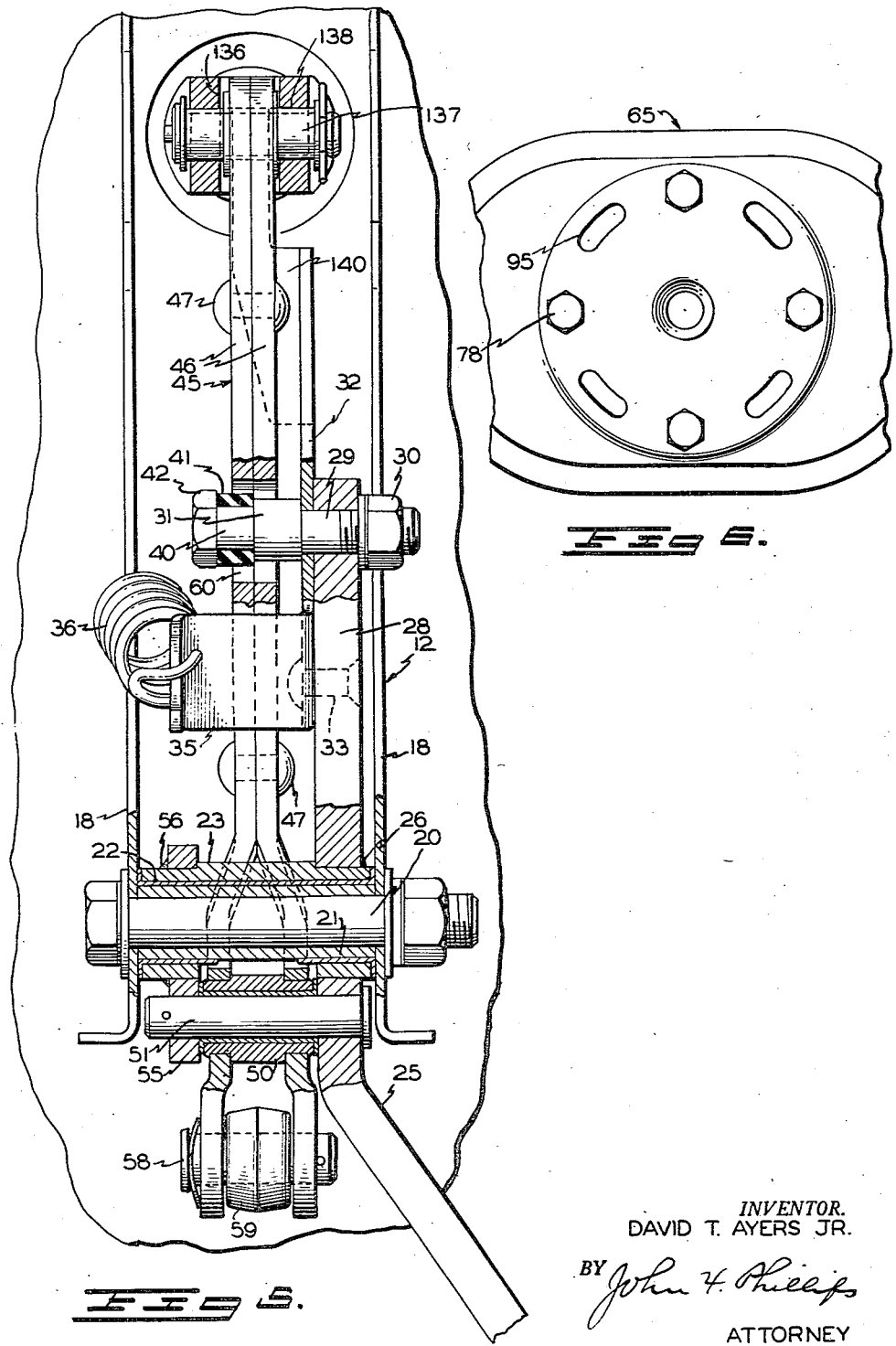

United States Patent Office 2,805,550
Patented Sept. 10, 1957

2,805,550

BOOSTER BRAKE MECHANISM

David T. Ayers, Jr., Birmingham, Mich., assignor to Kelsey-Hayes Company, a corporation of Delaware Application June 28, 1954, Serial No. 439,674

20 Claims. (Cl. 60—54.6)

This invention relates to a booster brake mechanism and is an improvement over the structure shown in the copending application of David T. Ayers, Jr., and Edward Govan Hill, Serial No. 420,488, filed March 2, 1954.

In the copending application referred to there is disclosed a novel type of booster brake mechanism having a bellows type motor connected to a lever mechanism mechanically associated with the brake pedal whereby, upon movement of the brake pedal, the motor would be energized to exert a pull on the lever associated therewith and assist the operator in applying the brakes. In such prior construction, the master cylinder is mounted on the fire wall of the vehicle forwardly thereof with the brake booster motor mounted against the fire wall rearwardly thereof and below the axis of the master cylinder. Such prior construction has been found to be highly satisfactory in operation in certain vehicles which do not pose an installation problem due to space limitations. In spite of its advantages, therefore, the structure of the copending application referred to is not universally capable of use on all motor vehicles.

An important object of the present invention is to provide a booster brake mechanism having a pusher type instead of a puller type booster motor, thus permitting the mounting of the motor above instead of below the axis of the master cylinder piston, thus rendering it practicable to install the apparatus in certain motor vehicles in which the prior construction referred to cannot be installed.

A further object is to provide such a construction wherein the functioning of the motor is such as to permit a slotted connection between the power-operated element of the motor and the lever for applying a force to the master cylinder piston, whereby, in the event of a failure of power in the source for the booster motor, the latter remains wholly inactive to permit all of the force exerted by the operator's foot to be utilized in applying the brakes without the operators having to utilize part of the brake pedal forces for overcoming the relatively heavy return spring of the booster motor.

A further object is to provide such an apparatus wherein, as opposed to prior constructions, the operation of the brake pedal releases, rather than actuates, the motor control valve for movement to a motor energizing position, the valve being biased for movement to such position.

A further object is to provide such an apparatus wherein a single spring, stronger than the valve-biasing spring, is employed for returning all of the parts to their normal off positions when the brake pedal is released.

A further object is to provide an apparatus of the character referred to which readily may be installed as original factory equipment, or which quite readily may be installed as an accessory after a vehicle is purchased.

Other objects and advantages of the invention will become apparent during the course of the following description.

In the drawings I have shown one embodiment of the invention. In this showing:

Figure 1 is a side elevation of the apparatus, parts being broken away and parts being shown in section, and with all of the parts shown in solid lines in their normal off positions;

Figure 2 is an enlarged fragmentary side elevation of the upper portion of the apparatus, parts being broken away and parts being shown in section;

Figure 3 is a similar fragmentary sectional view showing the parts in solid line positions with the brake fully applied;

Figure 4 is a plan view showing the clevis connections between the motor piston rod and the reaction lever and valve controlling element;

Figure 5 is an enlarged sectional view on line 5—5 of Figure 1; and

Figure 6 is a fragmentary face view of a portion of the air cleaner cap and associated elements.

Referring to Figure 1, the numeral 10 designates the fire wall of a motor vehicle a continuation of the lower portion of which forms the vehicle toe board 11. To the fire wall, rearwardly thereof, is secured a supporting bracket 12 which is generally triangular as shown in Figure 1. This bracket is secured at its lower portion to the fire wall by bolts 13 which serve to secure in position a conventional master cylinder 14 having a reservoir 15 and a conventional fluid displacing piston (not shown) operated in a manner to be described, by a push rod 16.

The bracket 12 comprises opposite parallel side walls 18 between which are arranged suitable levers, pivots, etc. for operating and controlling the apparatus. Referring to Figure 5, the parts of the mechanism supported by the bracket 12 include a shaft 20 in the form of a bolt surrounded by a sleeve 21 seating against the bracket walls 18 upon the tightening of the bolt referred to. Around the sleeve 21 is arranged a bushing 22 surrounded in turn by a rocking sleeve 23 cut away at the bottom thereof as shown in Figure 5, for a purpose which will become apparent. A pedal lever 25 surrounds the sleeve 23 and is welded thereto as at 26 (Figure 5) and the lower end of the pedal lever is provided with a pedal pad 27. The pedal lever is provided above the shaft 20 with an operating arm 28 through which projects a reduced end of a bolt 29 provided with a nut 30. An intermediate head 31 on the bolt seats against a bracket 32 to clamp such bracket to the lever arm 28, and below the bolt 29, the bracket 32 is riveted or otherwise secured as at 33 to the lever arm 28. Accordingly, it will be apparent that the brake lever and the bracket 32 rock as a unit about the axis of the shaft 20. The lower end of the bracket 32 is provided with a lateral projection 35 to which is connected one end of a return spring 36, the other end of this spring being connected as at 37 to one wall 18 of the bracket 12.

The bolt 29 is provided to the left of the head 31 as viewed in Figure 5 with a shank 40 which is slightly eccentric to the body of the bolt 29 and is surrounded by a resilient sleeve 41 maintained in position by a conventional head 42 carried by the bolt 29. The purpose of the eccentric shank 40 and surrounding resilient sleeve 41 will become apparent later.

A reaction lever indicated as a whole by the numeral 45, and preferably made up of complementary bars 46, is arranged substantially centrally between the bracket walls 18, the two members 46 being secured together in any suitable manner, for example by rivets 47. The lower ends of the members 46 diverge and are arched as at 48, as shown in dotted lines in Figure 1, to pass around the sleeve 23 out of contact therewith. Beneath the sleeve 23, the lever members 46 carry a thimble 50 rotatable on a pivot pin 51. One end of this pin projects through the pedal lever 25 as shown in Figure 5, while the other end of the pin passes through a plate 55 surrounding the sleeve 23 and welded thereto as at 56. Accordingly, there are balanced forces transversely of the pin 51 adjacent opposite ends thereof. At their lower extremities, the members 46 are pivoted as at 58 to a boss 59 carried by the adjacent end of the master cylinder piston push rod 16. The reaction lever 45, as will become more apparent below, is adapted to transmit brake applying forces through the rod 16 to the master cylinder piston, and this lever is slotted as at 60 to receive bushing 41. This bushing limits movement between levers 25 and 45.

The source of power for the apparatus comprises a vacuum motor indicated as a whole by the numeral 65. This motor comprises a stationary, preferably stamped head 66 secured by bolts 67 to a bracket 68 fixed to the fire wall. The lower end of this bracket is secured in position by the bolts 13 while the upper end of the bracket is fixed to the fire wall by bolts 69. A retaining ring 71 (Figure 3) is fixed to the head 66 by the bolts 67 and fixes with respect to the head 66 a bead 72 at the end of a bellows 73 forming the body of the motor.

The other end of the bellows 73 is fixed with respect to a movable head 74 which is preferably die cast and includes a peripheral flange 75 against which seats a bead 76 carried by the adjacent end of the bellows 73. This bead is retained in position by a sheet metal cap 77 secured to the head 74 by screws 78 threaded in bosses 79 integral with the head 74. The head 74 forms the pressure responsive element of the motor, as will become apparent.

The head 74 is provided with an integral axial extension 82 forming a valve housing in which is arranged a valve sleeve 83 engaging at one end against a resilient washer 84 and having its other end engaged and retained in position by the cap 77. The space between the two motor heads 66 and 74 forms a variable pressure chamber 85, and the valve housing 82 is provided with radial ports 86 communicating between the chamber 85 and an annular groove 87 formed around the valve sleeve 83. The valve sleeve 83 is provided with a second annular groove 88 This groove communicates through radial passages 89, formed in the head 74, with an annular space 90 formed between the head 74 and cap 77. The space 90 communicates through a nipple 91 with one end of a line 92 (Figure 1) the other end of which is connected to a suitable source of vacuum such as the intake manifold of the motor vehicle engine.

The cap 77 is preferably horizontally elongated as suggested in Figure 6, corresponding to the cross-sectional shape of the bellows 73, and the central portion of the cap is spaced from the body of the head 74 to receive an annular air cleaner 94. The adjacent portion of the cap is provided with atmospheric openings 95 (Figure 6) to admit air to the air cleaner 94, and to clean air flows into an annular space 96 surrounding the adjacent end of the valve sleeve 83. This sleeve is provided with radial ports 97 for the admission of air into the interior of the sleeve.

A spool valve 100 is slidable in the sleeve 83. This valve is provided with a pair of lands 101 and 102 forming therebetween an annular groove 103 normally communicating with the annular groove 87 through ports 104. The valve 100 is provided with ports 105 communicating between the groove 103 and the interior of the valve, which obviously is open to the atmosphere at all times through ports 97. Spaced from the land 101, the valve is provided with a third land 106 forming with the land 101 an annular groove 107 movable in the operative positions of the parts into communication with the ports 104 (Figure 2) and normally disconnected from such ports as in Figure 1. The groove 107 at all times communicates with the vacuum space 88 through ports 108 formed in the valve sleeve 83. A spring 110 biases the valve 100 to the operative position shown in Figure 2, the spring 36 (Figure 1) normally overbiasing the spring 110, as will be apparent below, to retain the valve 100 in its off position shown in Figure 1.

The valve housing 82 is provided with an integral axial projection 114 received in an axial recess in a tubular piston rod 115 projecting through the head 66. Referring to Figure 3, it will be noted that the retaining cup 71 is provided with a cylindrical inner portion 116 in which is arranged a resilient packing 117 backed up by a bearing 118 having a curved inner surface 119 to permit the rocking of the rod 115, as will become apparent.

The rod 115 has a reduced outer end secured in a recessed clevis rod 124 (Figure 3). Through the extension 114 and rod 115 projects a valve control rod 125 the left-hand end of which (Figure 2) engages against the adjacent end of the valve 100. On the right-hand end of the rod 125 is arranged a nylon or similar cap 126 shouldered as at 127 to limit its movement outwardly of the member 124. It will be apparent that the spring 110 biases the valve 100 to the motor energizing position shown in Figure 2, in which case the valve, its control rod 125 and the cap 126 will occupy the positions shown in Figures 2 and 3.

Within the motor bellows 73 is arranged a spring seat 130 against which is arranged one end of a relatively heavy return spring 131, the other end of this spring engaging the retaining cup 71 as shown in Figure 3. When the motor is de-energized, the spring 110 is compressed by action of the spring 36, and the return spring 131 maintains the bellows 73 extended. Movement of the motor head 74 to its extended position is limited by bosses 133 (Figure 4) which engage a rubber bumper 134 clamped between the head 66 and the bracket 68 (Figure 3).

Referring to Figures 1, 3, 4 and 5, it will be noted that the upper ends of the members 46 of the lever 45 extend into a slot 136 formed in the bar 124. Such ends of the lever carry a transverse pin 137 extending laterally into slots 138 formed in the bar 124, the pin 137 normally being arranged in the left-hand ends of the slots 138. It will be apparent that when the piston rod 115 moves to the right (Figure 3) the left-hand end of the slots 138 will pick up the pin 137 and effect movement of the upper end of the lever 45 toward the right.

The bracket 32 is provided at its upper end with a transversely bent portion 140 the upper end of which projects into the slot 32 and is curved as at 141 to form a contact element always in engagement with the thimble 126.

Operation

The parts normally occupy the positions shown in Figure 1, the brake pedal 25 occupying the solid line position shown. Under such conditions, the valve groove 103 is in communication with ports 104 and thus with the motor chamber 85. The valve groove 103 communicates through ports 105 with the interior of the valve 100, which is always in communication, as stated above, with the atmosphere. The valve land 101 will be to the left of the ports 104, and accordingly the vacuum ports 108 will communicate only with the valve groove 107. Therefore, atmospheric pressure will be present in the motor chamber 85.

The spring 36 is stronger than the spring 110. When the parts are released, therefore, the spring 36 maintains the bracket arm 32, and consequently the brake pedal, in the solid line position shown in Figure 1, and the valve control finger 141 maintains the valve in the off position referred to, against the tension of the spring 110.

When the brake is to be operated, the pedal pad 27 is depressed and the pedal lever 25 rocks about the pivot of the shaft 20, moving the bracket 32 and relieving pressure between the finger 141 and rod 125. The spring 110 now moves the valve 100 to a position cutting off communication between the groove 103 (Figure 2) and the port 104 and opening communication between such port and the groove 107. The latter is always connected to the source of vacuum through ports 108. Since the ports 104 are in fixed communication with the motor chamber 85, air will be exhausted from such chamber and atmospheric pressure will move the motor head 74 to the right. The parts will now assume the positions shown in Figure 2 so far as the valve mechanism is concerned, this figure showing the positions of the parts prior to actual movement of the motor.

Upon energization of the motor, the piston rod 115 will move to the right as viewed in Figures 1, 2 and 3, and the left-hand end of the slots 138 will engage the pin 137 and rock the lever 45 in a clockwise direction. This lever is pivoted to the brake lever by the pin 51. Forces will be transmitted directly by the motor through the lever 45 to operate the master cylinder push rod 16 which reacts against the brake lever through pin 51 to tend to resist rotational movement of the brake pedal. Accordingly the operator is caused to perform part of the work of applying the brakes through the pin 51, and this pin serves also to react against the brake pedal with a "feel" proportional to pressures built up in the master cylinder.

When the motor has been energized to its maximum extent, further foot pressure applied to the brake pedal will assist the motor in applying the brakes to the maximum extent.

Assuming that a brake application is made when no power is available for the motor, the operation of the brake pedal 25 will release the valve 100 for movement to its operative position, but the motor under such conditions will not be energized. Accordingly, no movement will be imparted to the rod 115 and the bar 124 will remain stationary. However, play will be taken up between the bushing 41 (Figure 5) and the slot in the lever 45, in which case the levers 25 and 45 will rock in a clockwise direction as a unit and the operator will manually apply the brakes. The pin 137 will move through the slots 138 and will encounter no resistance in such movement except for the rocking of the rod 115, which is permitted by the arcuate bushing face 119 (Figure 3) and the resiliency of the packing 117. The operator is completely relieved of the necessity for having to compress the relatively heavy motor return spring 131, the loading of which progressively increases as this spring is compressed. Thus substantially all of the foot-applied pedal forces will be available for a manual application of the brakes, thus rendering it wholly feasible to utilize the present construction with a relatively low brake pedal.

After the brake has been operated and the pedal has been released, the parts will return to normal positions in an obvious manner. The spring 36 will swing the finger 141 toward the left to the solid line position shown in Figure 1, and the pedal pad 27 likewise will return to its normal position. Movement of the finger 141 to the left will return the valve 100 to its normal position against the tension of the spring 110, and the motor chamber 85 will be opened to the atmosphere.

The present construction is extremely simple and, as stated, may be installed as factory equipment or as an accessory. It may be mounted in motor vehicles in which the structure of the copending application cannot be installed because of space limitations, and the structure has the distinct advantage of relieving the operator of the necessity of having to compress the motor return spring in a brake application when no power is present. Of course the construction also is advantageous since there is no problem of leakage of hydraulic brake fluid from the master cylinder into the motor.

It is to be understood that the form of the invention shown and described is to be taken as a preferred example of the same and that various changes may be made in the construction without departing from the scope of the appended claims.

I claim:

1. A booster brake mechanism comprising a master cylinder having an operating rod, a pivotally supported pedal lever, a second lever pivoted to said pedal lever and connected to said operating rod, a motor having a power-operable unit including a power transmitting rod having mechanical engagement with said second lever whereby operation of said motor turns said second lever in one direction to operate the master cylinder, means providing lost motion between said levers, and a control mechanism connected to said motor and engaging said pedal lever and operative within the limits of said lost motion for energizing said motor, the mechanical engagement between said power transmitting rod and said second lever being an abutting engagement whereby, upon a failure of power in said motor, said second lever is movable independently of said motor for a manual operation of said master cylinder upon operation of said pedal lever.

2. Apparatus according to claim 1 wherein the point of mechanical engagement of said power transmitting rod with said second lever moves in a given direction upon energization of said motor, said motor being arranged at the side of said second lever opposite said direction whereby said motor, upon energization thereof, effects a pushing force against said second lever.

3. Apparatus according to claim 1 wherein the point of mechanical engagement of said power transmitting rod with said second lever moves in a given direction upon energization of said motor, said motor being arranged at the side of said second lever opposite said direction whereby said motor, upon energization thereof, effects a pushing force against said second lever, the mechanical engagement between said power transmitting rod and said second lever comprising a pin carried by said second lever, said power transmitting rod having a slot and said pin being arranged in said slot and normally in the end thereof opposite said direction of movement.

4. A booster brake mechanism comprising a master cylinder having an operating rod, a pivotally supported pedal lever, a second lever pivoted to said pedal lever and having lost motion connection therewith, said second lever being connected to said operating rod, a fluid motor having a pressure responsive unit including a power transmitting rod normally having mechanical engagement with said second lever to effect movement thereof in one direction from a normal off position, said motor being arranged at the side of said levers opposite said direction whereby the motor force applied to said second lever is a pushing force, a control valve connected to said motor and having mechanical connection with said pedal lever, said valve normally occupying a first position de-energizing said motor and movable to a second position energizing said motor, resilient means biasing said valve to said second position, and stronger resilient means engaging said pedal lever and biasing such lever to its normal off position to normally retain said valve in said first position.

5. Apparatus according to claim 4 wherein the mechanical engagement between said power transmitting rod and said second lever is an abutting engagement whereby said second lever, upon a failure of power for said motor, is movable with said pedal lever independently of said motor.

6. Apparatus according to claim 4 wherein the mechanical engagement between said power transmitting rod and said second lever is in the form of a pin carried by said second lever and engaging a slot in said power transmitting rod, said pin normally being arranged in the end of said slot opposite said direction of movement.

7. A booster brake mechanism comprising a master cylinder having an operating rod, a pedal lever pivoted about an axis intermediate its ends, a second lever pivoted to said pedal lever at one side of said axis toward one end of said pedal lever and having an end projecting beyond said axis toward the other end of said pedal lever, means connecting said second lever to said operating rod, a motor having a power operable unit including a power transmitting rod, means providing an abutting engagement between said power transmitting rod and said end of said second lever whereby energization of said motor effects movement of said end of said second lever in one direction from a normal position, said end of said second lever being movable in said direction independently of said power transmitting rod, a control mechanism connected to said motor and comprising a member having a normal position de-energizing said motor and being movable to a second position energizing said motor, resilient means biasing said member to said second position, a control rod having connection at one end with said member and at its other end against said other end of said pedal lever, and resilient means stronger than said first-named resilient means biasing said pedal lever to a normal off position, said levers having limited lost motion connection with each other.

8. Apparatus according to claim 7 wherein the means providing said abutting engagement comprises a pin and slot connection between said end of said second lever and said power transmitting rod, whereby energization of said motor effects movement of said end of said second lever in said direction and said end of said second lever is movable in said direction independently of said power transmitting rod upon a failure of power in said motor.

9. Apparatus according to claim 7 wherein said motor is of the differential fluid pressure type, said control mechanism comprising a valve operable in its normal position for balancing motor pressures and operable in said second position for connecting said motor to a source of pressure different from the atmosphere.

10. A booster brake mechanism comprising a master cylinder having an operating rod, a pedal lever arranged in a vertical plane and pivoted about a first axis above said operating rod, a second lever connected to said operating rod and pivoted to said pedal lever for turning movement on an axis between said first axis and said operating rod and projecting upwardly above said first axis, means providing limited lost motion between said levers, a motor comprising a power operable unit including a power transmitting rod arranged substantially above said first axis, means providing an abutting power transmitting engagement between said power transmitting rod and the upper end of said second lever whereby, upon energization of said motor, said upper end of said second lever will be moved in one direction from a normal off position and will be movable in such direction independently of said power transmitting rod upon a failure of power in said motor, and means connected to said motor and having mechanical engagement with said pedal lever and operable within the limits of said lost motion connection between said levers for controlling energization of said motor.

11. Apparatus according to claim 10 wherein the means for controlling energization of said motor comprises a member movable between a first position in which said motor is de-energized and a second position in which said motor is energized, means biasing said member to said second position, a control rod for said member having abutting engagement with the upper end of said pedal lever, and resilient means stronger than said biasing means connected to said pedal lever for biasing said pedal lever to a normal off position to normally hold said member in said first position.

12. Apparatus according to claim 10 wherein said motor is of the fluid pressure operated type and includes a variable pressure chamber, said means for controlling energization of said motor comprising a valve operable in a normal position for connecting said motor chamber to the atmosphere and movable to a second position connecting said motor chamber to a source of pressure different from the atmosphere, a spring biasing said valve to said second position, a stronger spring connected to said pedal lever and biasing said pedal lever to a normal off position, and means interposed between the upper end of said pedal lever and said valve for maintaining the latter in its normal position when said pedal lever is in a normal off position.

13. A booster brake mechanism comprising a master cylinder having an operating rod, a pedal lever pivoted about an axis above said operating rod, a second lever pivoted to said pedal lever between said axis and said operating rod and connected at its lower end to said operating rod, said second lever projecting above said axis in adjacent relationship to said pedal lever, means providing limited lost motion between said levers, a fluid motor having a fixed head and a movable head and a bellows therebetween forming a variable pressure chamber, a power transmitting rod connected at one end to said moveable head and having its other end projecting through said fixed head, means providing an abutting engagement between said other end of said power transmitting rod and the upper end of said second lever to transmit a pushing force thereto upon energization of said motor to move said operating rod, and a control valve mechanism for said motor comprising a valve member having a normal position connecting said motor chamber to the atmosphere and movable to a second position connecting said motor chamber to a source of vacuum, and means for controlling said valve member comprising a connection between such valve member and the upper end of said pedal lever.

14. Apparatus according to claim 13 wherein the means for controlling said valve member further comprises a spring biasing such member to said second position, and a stronger spring connected to said pedal lever and biasing said pedal lever to a normal off position, said connection between said valve member and said upper end of said pedal lever comprising a rod having engagement at one end with said valve member and at its other end with the upper end of said pedal lever.

15. Apparatus according to claim 13 wherein said means providing abutting relationship between said power transmitting rod and said upper end of said second lever comprises a pin and slot connection whereby energization of said motor effects movement of said second lever but wherein said second lever is movable from its normal off position independently of said power transmitting rod upon a failure of power in said motor.

16. Apparatus according to claim 13 wherein the means for controlling said valve member further comprises a spring biasing such member to said second position, and a stronger spring connected to said pedal lever and biasing said pedal lever to a normal off position, said connection between said valve member and said upper end of said pedal lever comprising a rod having engagement at one end with said valve member and at its other end with the upper end of said pedal lever, said means for providing abutting engagement between said power transmitting rod and the upper end of said second lever comprising a pin carried by said second lever, said power transmitting rod having a slot in which said pin is operative, said pin normally being arranged in the end of said slot opposite the direction of movement of the upper end of said pedal lever from its normal off position.

17. In combination a motor vehicle fire wall, a master cylinder carried by said fire wall forwardly thereof and having an operating rod projecting rearwardly of said fire wall, a support carried by said fire wall rearwardly thereof, a pedal lever arranged in a vertical plane and pivoted on an axis intermediate its ends to said support above said operating rod, a second lever pivoted to said pedal lever between said axis and said operating rod and connected at its lower end to said operating rod, said second lever and said pedal lever having upwardly projecting adjacent ends, means providing limited lost motion between said levers, a fluid motor carried by said fire wall forwardly thereof and having a power-operable unit including a power transmitting rod projecting rearwardly through said fire wall, means providing an abutting operating engagement between said power transmitting rod and the upper end of said second lever to move the latter rearwardly upon energization of said motor and to provide for rearward movement of the upper end of said second lever independently of said power transmitting rod upon a failure of power in said motor, and means connected to said motor for controlling energization of said motor including a control member engageable with the upper end of said pedal lever.

18. Apparatus according to claim 17 wherein said means for controlling energization of said motor comprises a valve mechanism including a valve member having a normal position balancing pressures affecting said motor and movable to a second position to energize said motor, means biasing said valve member to said second position, and stronger means engaging said pedal lever and biasing it to a normal off position in which it retains said valve in its normal position.

19. Apparatus according to claim 17 wherein said motor comprises a fixed head carried by said fire wall, a movable head forwardly thereof, and a bellows connected between said heads and forming therewith a motor chamber, said means for controlling energization of said motor comprising a valve member movable between a normal position in which said chamber is connected to the atmosphere and a second position in which said chamber is connected to a source of vacuum, a spring biasing said valve member to its second position, and a stronger spring biasing said pedal lever and biasing it to a normal off position, said controlling means further comprising a rod contacting at one end with the upper end of said pedal lever and having its other end engaging said valve.

20. A booster brake mechanism comprising a master cylinder having an operating rod, a motor having a power operable unit, a lever mechanism comprising a pedal lever and a power lever pivotally connected to each other, said power lever having mechanical connection with said power operable unit and being connected to said operating rod, means providing lost motion connection between said power lever and said pedal lever, a control mechanism connected to said motor and having mechanical connection wtih said pedal lever and operable within the limits of said lost motion connection for energizing said motor, the mechanical connection between said power operable unit and said power lever being an abutting connection whereby, upon a failure of power in said motor, said lever mechanism is operable independently of said motor for a manual oepration of said master cylinder upon operation of said pedal lever, said control mechanism having a normal position de-energizing said motor, means biasing said control mechanism to an operative position connecting said motor to a source of power, and spring means connected to said pedal lever and overcoming said biasing means to hold said control mechanism in its normal position when said pedal lever is in a normal off position.

References Cited in the file of this patent
UNITED STATES PATENTS

| | | |
|---|---|---|
| 1,468,602 | Loughead | Sept. 18, 1923 |
| 1,846,017 | Albinson | Feb. 23, 1932 |
| 2,107,110 | Eaton et al. | Feb. 1, 1938 |
| 2,130,799 | Hofstetter | Sept. 20, 1938 |